(12) United States Patent
Moghimi et al.

(10) Patent No.: US 12,008,663 B2
(45) Date of Patent: Jun. 11, 2024

(54) COMPREHENSIVE MULTI-CRITERIA MULTI-OBJECTIVE ECONOMIC ANALYSIS TOOL FOR GROWING CROPS

(71) Applicant: Texas State University, San Marcos, TX (US)

(72) Inventors: Faraz Moghimi, Jamaica Plain, MA (US); Bahram Asiabanpour, San Marcos, TX (US)

(73) Assignee: Texas State University, San Marcos, TX (US)

( * ) Notice: Subject to any disclaimer, the term of this patent is extended or adjusted under 35 U.S.C. 154(b) by 52 days.

(21) Appl. No.: 17/515,824

(22) Filed: Nov. 1, 2021

(65) Prior Publication Data

US 2022/0138869 A1    May 5, 2022

Related U.S. Application Data

(60) Provisional application No. 63/108,538, filed on Nov. 2, 2020.

(51) Int. Cl.
*G06Q 50/02* (2024.01)
*G06Q 10/0635* (2023.01)

(52) U.S. Cl.
CPC ......... *G06Q 50/02* (2013.01); *G06Q 10/0635* (2013.01)

(58) Field of Classification Search
CPC ............................ G06Q 50/02; G06Q 10/0635
USPC ......................................................... 705/7.28
See application file for complete search history.

(56) References Cited

U.S. PATENT DOCUMENTS

| | | | |
|---|---|---|---|
| 7,047,133 B1 * | 5/2006 | Dyer | G06Q 10/04 |
| | | | 702/5 |
| 7,493,277 B1 | 2/2009 | Uhl et al. | |
| 7,756,732 B2 | 7/2010 | McLean et al. | |
| 7,822,654 B2 | 10/2010 | Block et al. | |
| 8,234,156 B2 * | 7/2012 | Comas | G06Q 40/03 |
| | | | 705/35 |

(Continued)

FOREIGN PATENT DOCUMENTS

EP    3046066 B1    2/2019

OTHER PUBLICATIONS

Mostafa Abbasi, "Land suitability assessment for Paulownia cultivation using combined GIS", School of Industrial Engineering, Iran University of Science and Technology, Tehran, Iran, (2020) (Year: 2020).*

(Continued)

*Primary Examiner* — Abdallah A El-Hage Hassan
(74) *Attorney, Agent, or Firm* — Shackelford, McKinley & Norton, LLP; Frank Amini

(57) ABSTRACT

Embodiments of the present disclosure pertain to methods of determining the feasibility of growing one or more crops by evaluating a plurality of risk factors associated with the growing and determining the feasibility of the growing based on the evaluation of the risk factors. In some embodiments, the methods of the present disclosure also include steps of tailoring the risk factors based on the determination of the feasibility of the growing and re-determining the feasibility of the growing by evaluation of the tailored risk factors. Additional embodiments of the present disclosure also include a step of implementing the growing based on the determination of the feasibility of the growing.

17 Claims, 9 Drawing Sheets

(56) References Cited

U.S. PATENT DOCUMENTS

| | | |
|---|---|---|
| 8,533,993 B2 | 9/2013 | Pettibone |
| 9,140,824 B1* | 9/2015 | Mewes .................. A01D 91/00 |
| 9,357,718 B1 | 6/2016 | Lehman et al. |
| 10,306,847 B2* | 6/2019 | Whitcher ................ A01G 9/246 |
| 11,263,707 B2* | 3/2022 | Perry ........................ G06N 3/08 |
| 2002/0183867 A1 | 12/2002 | Gupta et al. |
| 2006/0178957 A1 | 8/2006 | LeClaire |
| 2011/0131876 A1 | 6/2011 | Pettibone |
| 2015/0027048 A1 | 1/2015 | Fok et al. |
| 2016/0037739 A1 | 2/2016 | Fankuchen et al. |
| 2016/0078375 A1 | 3/2016 | Ethington et al. |
| 2016/0155161 A1 | 6/2016 | Reisman |
| 2016/0232621 A1* | 8/2016 | Ethington .............. G06Q 50/02 |
| 2017/0027112 A1 | 2/2017 | Vail et al. |
| 2018/0156767 A1* | 6/2018 | Osborne .................. A01G 7/00 |
| 2022/0164736 A1* | 5/2022 | Johnson ............... G06Q 10/067 |

OTHER PUBLICATIONS

Molin, M. M. (2019). Environmental Assessment of an Urban Vertical and Hydroponic Farming System in Sweden.

Sulma Vanessa Souzaa, a. o. (2019). Economic viability for deploying hydroponic system in emerging countries: A differentiated risk adjustment proposal. Land Use Policy.

Trimbo, A. A. (2019). Economic Sustainability of Indoor Vertical Farming . Escola De Administração De Empresas De São Paulo.

Moghimi et al., A Framework for Financial Analysis of the Vertical Farming Systems, Proceedings of the 2020 IISE Annual Conference, 646-651, May 30-Jun. 2, 2022.

* cited by examiner

COMPREHENSIVE MULTI-CRITERIA MULTI-OBJECTIVE ECONOMIC ANALYSIS TOOL FOR GROWING CROPS

CROSS-REFERENCE TO RELATED APPLICATIONS

This application claims priority to U.S. Provisional Patent Application No. 63/108,538, filed on Nov. 2, 2020. The entirety of the aforementioned application is incorporated herein by reference.

BACKGROUND

Determining the economic prospect of growing various crops through various farming methods in various locations can be unpredictable and risky. Numerous embodiments of the present disclosure address the aforementioned limitations.

SUMMARY

In some embodiments, the present disclosure pertains to methods of determining the feasibility of growing one or more crops by evaluating a plurality of risk factors associated with the growing and determining the feasibility of the growing based on the evaluation of the risk factors. In some embodiments, the methods of the present disclosure also include steps of tailoring the risk factors based on the determination of the feasibility of the growing and re-determining the feasibility of the growing by evaluation of the tailored risk factors. Additional embodiments of the present disclosure also include a step of implementing the growing based on the determination of the feasibility of the growing.

In some embodiments, the determining and evaluating steps include entering data related to the risk factors into a software. In some embodiments, the software utilizes a decision support system to generate a report related to the feasibility of the growing based on the evaluation of the risk factors.

The methods of the present disclosure can have numerous embodiments. For instance, in some embodiments, the methods of the present disclosure are utilized to determine the feasibility of growing one or more crops through vertical farming. In some embodiments, the one or more crops include, without limitation, corn, cotton, wool, beans, fruits, nuts, potatoes, rice, soybeans, oil-based crops, sugars, vegetables, herbs, melons, wheat, and combinations thereof.

DRAWINGS

DETAILED DESCRIPTION

It is to be understood that both the foregoing general description and the following detailed description are illustrative and explanatory, and are not restrictive of the subject matter, as claimed. In this application, the use of the singular includes the plural, the word "a" or "an" means "at least one", and the use of "or" means "and/or", unless specifically stated otherwise. Furthermore, the use of the term "including", as well as other forms, such as "includes" and "included", is not limiting. Also, terms such as "element" or "component" encompass both elements or components comprising one unit and elements or components that comprise more than one unit unless specifically stated otherwise.

The section headings used herein are for organizational purposes and are not to be construed as limiting the subject matter described. All documents, or portions of documents, cited in this application, including, but not limited to, patents, patent applications, articles, books, and treatises, are hereby expressly incorporated herein by reference in their entirety for any purpose. In the event that one or more of the incorporated literature and similar materials defines a term in a manner that contradicts the definition of that term in this application, this application controls.

There are various problems associated with conventional practices of farming. For instance, in the past few years alone, agriculture has been responsible for a million square kilometers of deforestation. Moreover, the world is facing a water crisis. Additionally, farming is responsible for using 80% of the world's freshwater.

Furthermore, the prospect of global climate change is projecting a much riskier future to practices of conventional farming due to more pesticide incidences, weather uncertainties, changing rain patterns, and more frequent climate extremes. Accordingly, one could argue that these alarming problems might someday be treated as more imminent as the population grows, less fertile land becomes available, and the effects of global climate change become more apparent.

Vertical farming solves a lot of the aforementioned issues associated with traditional farming by using considerably less water, requiring less land, and not significantly relying on environmental conditions. However, vertical farming is also energy and labor intensive. Moreover, vertical farming can be quite expensive in some cases.

As such, the economic prospect of practicing vertical farming can be questionable depending on various parameters in different markets. Similar issues apply to different types of farming methods.

Accordingly, a need exists to quantitatively model and evaluate the economic prospect of pursuing numerous types of farming as a business venture in a competitive marketplace under different circumstances. Numerous embodiments of the present disclosure address the aforementioned need.

Figure 1:
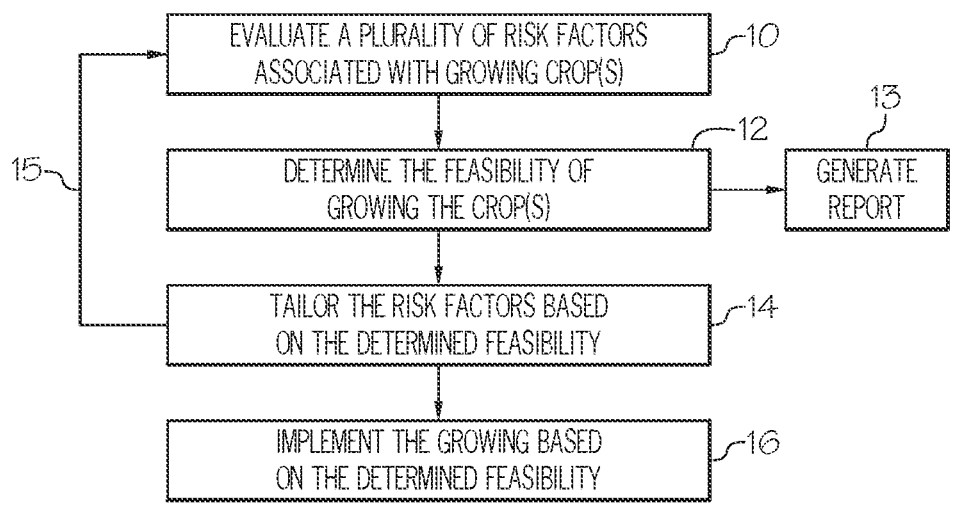
FIG. 1 illustrates a method of determining the feasibility of growing one or more crops.

In some embodiments, the present disclosure pertains to methods of determining the feasibility of growing one or more crops. In some embodiments illustrated in FIG. 1, the methods of the present disclosure include: evaluating a plurality of risk factors associated with growing the one or more crops (step 10); and determining the feasibility of growing the one or more crops based on the evaluation of the risk factors (step 12). In some embodiments, a report is generated to illustrate the feasibility of growing the one or more crops (step 13).

In some embodiments, the methods of the present disclosure also include a step of tailoring the risk factors based on the determined feasibility of growing one or more crops (step 14). In some embodiments, the methods of the present disclosure also include a step of re-determining the feasibility of the growing by evaluating the tailored risk factors (step 15). In some embodiments, the methods of the present disclosure also include a step of implementing the growth of the one or more crops based on the determined feasibility (step 16).

Additional embodiments of the present disclosure pertain to systems for determining the feasibility of growing one or more crops in accordance with the methods of the present disclosure. In some embodiments, the systems of the present disclosure are in the form of a software. Other domains of implementation other than a software can also be envisioned.

As set forth in more detail herein, the methods and systems of the present disclosure can have numerous embodiments. For instance, the methods and systems of the present disclosure can evaluate numerous risk factors. Moreover, the methods and systems of the present disclosure can utilize numerous mechanisms to determine the feasibility of growing various types of crops based on the risk factors. Additionally, the methods of the present disclosure can implement the growing of the crops in various manners.

Risk Factors

The methods and systems of the present disclosure can evaluate numerous risk factors to determine the feasibility of growing one or more crops. For instance, in some embodiments, the risk factors include, without limitation, the growing season, location, scale of production, type of crop, the feed of the crop, the watering routine of the crop, expected profit, production risk factors, price risk factors, market risk factors, financial risk factors, institutional risk factors, human risk factors, regional risk factors, cost of production, cost appeal, potential for environmental harm from growing the crop, the type of farming, regional insurance rate, regional subsidy rate, regional energy price, regional crop price, regional water price, regional land price, regional labor rate, water consumption requirements, energy consumption requirements, labor requirements, and combinations thereof.

In some embodiments, the methods and systems of the present disclosure evaluate a prospective farming practice in a competitive market setting. For instance, in some embodiments, the evaluation of the risk factors are conducted with respect to current conditions of a possible competition, such as a regional dominant farming practice that is already in place.

In some embodiments, the risk factors include the location of growing the one or more crops. In some embodiments, the risk factors associated with the location include, without limitation, tax rates of the location, weather conditions of the location, energy prices of the location, land prices of the location, or combinations thereof.

In some embodiments, the risk factors include the scale of production of growing the one or more crops. In some embodiments, the scale of production is characterized by average seasonal production measured in weight.

In some embodiments, the risk factors include the expected profit from growing the one or more crops. In some embodiments, the expected profit is evaluated by considering expected income, costs, taxes, or combinations thereof. In some embodiments, a farming practice and the risks factors are evaluated by considering a competitive profit margin of a product under various conditions.

In some embodiments, the risk factors include the regional risk factors. In some embodiments, the regional risk factors are evaluated by considering insurance rates and subsidy rates in a particular location.

In some embodiments, the risk factors include the cost of production. In some embodiments, the cost of production is evaluated by considering labor cost, energy cost, rent cost, water cost, or combinations thereof.

In some embodiments, the risk factors include the cost appeal. In some embodiments, the cost appeal is evaluated by considering labor hours required per kg of crop, energy consumption per kg of crop, water consumption per kg of crop, land required per kg of crop, water price, energy price, land rent price, labor price, crop price, cost indicator function, profit margin for growing the crop, or combinations thereof.

In some embodiments, the risk factors include the potential for environmental harm from growing the crop. In some embodiments, the potential for environmental harm from growing the crop is evaluated by considering expected greenhouse gas emissions from growing the crop, deforestation from growing the crop, waste production from growing the crop, irrigation harm from growing the crop, or combinations thereof.

In some embodiments, the risk factors include the type of farming. In some embodiments, the type of farming includes, without limitation, vertical farming, greenhouse farming, hydroponic farming, traditional farming, or combinations thereof.

Evaluating Risk Factors and Determining the Feasibility of Growing Crops

The methods and systems of the present disclosure can evaluate risk factors and determine the feasibility of growing one or more crops in various manners. For instance, in some embodiments, the evaluation and determination steps occur through the utilization of a software. In some embodiments, the evaluation and determination steps occur by entering data related to the risk factors of growing one or more crops into a software.

In some embodiments, the software generates a report related to the determined feasibility of growing one or more crops based on the evaluation of the risk factors. In some embodiments, the feasibility determination is made by utilizing a decision support system. In some embodiments, the decision support system compares the entered data with existing data related to the risk factors.

In some embodiments, the determined feasibility report ranks location alternatives for growing one or more crops in one or more different regions. In some embodiments, the determined feasibility report ranks the relative location appeal of growing one or more crops in one or more different regions. In some embodiments, the determined feasibility report generates the production costs of growing one or more crops in one or more different regions. In some embodiments, the determined feasibility report generates the economic appeal of growing one or more crops in one or more different regions through the utilization of one or more different growing practices.

Tailoring the Risk Factors

In some embodiments, the methods and systems of the present disclosure can also include a step of tailoring risk factors based on the determined feasibility of growing one or more crops. In some embodiments, the methods and systems of the present disclosure can then re-determine the feasibility of growing one or more crops by evaluating the tailored risk factors.

In some embodiments, the tailored risk factors include different variations of the risk factors. In some embodiments, the tailored risk factors include modified versions of the risk factors. In some embodiments, the tailored risk factors include, without limitation, a location of the crop, the feed of the crop, the type of the crop, the watering routine of the crop, or combinations thereof.

Growing the Crops

In some embodiments, the methods and systems of the present disclosure can also be utilized to implement the growing of one or more crops based on the determined feasibility of growing the one or more crops. As such, in some embodiments, the methods of the present disclosure also include a step of growing one or more crops based on the determined feasibility of growing the one or more crops. In some embodiments, the methods and systems of the present disclosure can be utilized to optimize the growing of one or more crops based on the determined feasibility.

Crops

The methods and systems of the present disclosure can be utilized to determine the feasibility of growing numerous types of crops. For instance, in some embodiments, the one or more crops include, without limitation, corn, cotton, wool, beans, fruits, nuts, potatoes, rice, soybeans, oil-based crops, sugars, vegetables, herbs, melons, wheat, and combinations thereof. In some embodiments, the one or more crops include vegetables, such as tomatoes, lettuce, or combinations thereof. In some embodiments, the one or more crops include herbs, such as basil.

Growth Methods

The methods and systems of the present disclosure can be utilized to determine the feasibility of growing numerous types of crops through various growth methods. For instance, in some embodiments, the growth methods include, without limitation, vertical farming, greenhouse farming, hydroponic farming, traditional farming, or combinations thereof. In some embodiments, the growth methods include vertical farming.

Applications

The methods and systems of the present disclosure can also have macro implications. For instance, in some embodiments, the methods and systems of the present disclosure can be utilized to evaluate and simulate the economic or risk prospect of new farming prospects, such as new farming technologies, new farming policies, and the like.

In more specific embodiments, if Congress passes a new law cutting vegetable insurance subsidies in certain states, the systems and methods of the present disclosure can be utilized to evaluate the impact of this policy in the market for numerous farming practices, such as vertical farming and the like. In another specific embodiment, if one wants to see what happens if tomato insurance subsidies in Texas are cut, and the projections show a bad storm season, then the methods and systems of the present disclosure could be utilized to incorporate the aforementioned factors into providing quantitative metrics of how tomato farming with certain practices would look like under those conditions and provide numerous answers, such as a better practice, a competitive price, an optimal scale, and the like in that situation.

The methods and systems of the present disclosure can also be utilized to evaluate new farming technologies. For instance, in some embodiments, the methods and systems of the present disclosure can be utilized to answer questions such as the impact of the use of a hypothetical new farming machinery that reduces energy consumption in the marketplace to one or more farming practices.

Additional Embodiments

Reference will now be made to more specific embodiments of the present disclosure and experimental results that provide support for such embodiments. However, Applicants note that the disclosure herein is for illustrative purposes only and is not intended to limit the scope of the claimed subject matter in any way.

Example 1. A Comprehensive Multi-Criteria and Multi-Objective Economic Analysis Tool for Vertical Farming In this Example, Applicants formulate and propose a stochastic model that can be used to identify the most profitable, least risky, and least environmentally hazardous states of vertical farming implementation.

Example 1.1. Utilization of State Variables

The model in this Example utilized the following state variables: (1) season (investment time period chosen by the investor); (2) location (including tax rates, weather conditions, energy prices, and land prices); (3) scale (average seasonal production measured in weight); and (4) product type (the produced crops by vertical farming systems, such as lettuce, basil, and tomato).

Example 1.2. Evaluation of Profit

In this Example, profit is evaluated using income, cost, and tax (i.e., f (income, cost, tax)) through the following equations: (1) cost=f(initial investment, labor cost, energy cost, water cost, material cost, transportation cost, maintaining equipment cost, insurance cost); and (2) income=f (sales, market price).

Example 1.3. Consideration of Risk

This Example considers several risks, including (1) production risk, (2) price or market risk, (3) financial risk, (4) institutional risk, and (5) human or personal risk. By eliminating common risks between vertical farming and traditional farming, only production risk is left, which is almost equable with the insurance rate (i.e., E (simplified farming risk)~insurance rate).

Example 1.4. Consideration of Environmental Hazard

Different aspects of farming's environmental harm are greenhouse gas emission, deforestation, waste production, and irrigation harm (i.e., environmental hazard=f(greenhouse gas emission, deforestation, waste, irrigation).

Example 1.5. Development of a Multi-Objective Model

The approach in this Example considers vertical farming as an alternative to traditional farming. Thus, the relative function is the criteria for assessment. Accordingly, the multi-objective model can be characterized as follows:

Find $s, l, k, p$ in condition that:

Max $Z$ = The Relative Profit =

$$\text{Relative}\left(\sum_{j=0}^{j=n}\sum_{i=0}^{i=m} p_{ij} \cdot \text{Profit}(s, l, k, p)_{ij} \cdot \left(\frac{p}{A}, MARR, j\right)\right)$$

Min $Y$ = The relative risk = Relative(Risk) = $\text{Relative}\left(\sum_{j=0}^{j=n} S_j^2\right)$ Min $X$ = The relative Environmental Hazard =

$$\text{Relative}\left(\sum_{j=0}^{j=n}\text{Environmental Hazard}(s, l, k, p)_j\right)$$

s.t.

$n, m \in \mathbb{N}$ $n, m < \infty$ $MARR \in \mathbb{R}$ $0 < MARR < 1$

The three defined objectives are generally important to every investor or decision-maker. However, their relative importance can vary depending on the personal characteristics of a decision-maker.

Max $V = w1 \cdot \text{Standardscalar}(Z) - w2 \cdot \text{Standardscalar}(Y) - w3 \cdot \text{Standardscalar}(X)$

Example 1.6. Determining Cost of Production

Due the lack of availability of data related to vertical farming, the above model is simplified to a decision model that can be utilized for locating the best vertical farming location from a set of n alternatives by taking into account the cost/profit potential and risk (i.e., cost of production=f (labor cost, energy cost, rent cost, water cost)).

Example 1.7. Determining Profit Margin Appeal of Location

The profit margin appeal of a location (i) can be calculated by the following formula: profit margin appeal of a location=f (cost of labor per kg(i), cost of energy per kg(i), cost of rent per kg(i), regional price per(i) kg).

Example 1.8. Calculation of Risk

To calculate the risk, the US Department of Agriculture's insurance estimation is utilized as an accurate representation of farming risks in the US through the following formula: Regional Risk in Location(i)=f (insurance rate (i), subsidy rate (i)).

Example 1.9. Regional Profit Margin Appeal Formulation

In this Example, Applicants propose a regional cost appeal indicator model that would provide the relative economic appeal of a vertical farming business venture with respect to traditional agriculture in a particular marketplace. Table 1 illustrates the variables used in this indicator model, along with their descriptions and abbreviations.

TABLE 1

Provides descriptions for the parameters used to formulate the Regional Cost Appeal model.

| Name of the Variable | Unit | abbv | Description |
|---|---|---|---|
| Man Hour per kg | Man hour/kg | q1 | the required hours of labor to produce a kg of romaine lettuce with a vertical farming practice |
| Energy Consumption Per kg | KwH/kg | q2 | the required energy input to produce a kg of romaine lettuce with a vertical farming practice |
| Water Consumption Per kg | L/kg | q3 | the required water input to produce a kg of romaine lettuce with a vertical farming practice |
| Land required per kg | M2/kg | q4 | the land required to produce a kg of lettuce with a vertical farming practice. This parameter is scaled based on a yearly production of approximation 90,000 kg for each type of practice |
| Water price | USD/L | p1 | Unit price of water in a region |
| Energy price | USD/KwH | p2 | Unit price of energy in a particular region |
| Land rent price | USD/M2 | p3 | Unit price of rent in a particular region for particular practice form (vertical/field grown) |
| Labor price | USD/ManHour | p4 | Unit price of labor in a particular region |
| Lettuce Price | USD/kg | pr | Unit price of romaine lettuce in a particular region |
| Cost indicator function in location i | % | C | An indicator determining the economic appeal of implementing vertical farming in particular location |
| Man Hour per kg | Man hour/kg | Q1 | the required hours of labor to produce a kg of romaine lettuce using traditional farming practices |

TABLE 1-continued

Provides descriptions for the parameters used to formulate the Regional Cost Appeal model.

| Name of the Variable | Unit | abbv | Description |
|---|---|---|---|
| Energy Consumption Per kg | KwH/kg | Q2 | the required energy input to produce a kg of romaine lettuce using traditional farming practices |
| Water Consumption Per kg | L/kg | Q3 | the required water input to produce a kg of romaine lettuce using traditional farming practices |
| Land required per kg | M2/kg | Q4 | the land required to produce a kg of lettuce using traditional farming practices. This parameter is scaled based on a yearly production of approximation 90,000 kg for each type of practice |
| Production Cost Per kg for vertical farming practice | USD/kg | CV | As defined in Equation 1. Equation 1 |
| Production Cost Per kg for traditional farming (field grown) practice | USD/kg | CT | As defined in Equation 2. Equation 1 |
| Profit margin of growing crops in location i with vertical farming practice | % | PV | As defined in Equation 3. Equation 1 |
| Profit margin of growing crops in location i with traditional farming practice | % | PT | As defined in Equation 4. Equation 1 |
| Relative profit margin appeal of growing crops in location i | % | PA | As defined in Equation 5. Equation 1 |

Applicants now define an indicator model CV(i), which provides the production cost of a kg of crops in location i utilizing a vertical farming practice as follows:

$$CV(i) = \left(\sum_{j=0}^{j=4} p(i)_j \cdot q_j\right)$$

Equation 1. The cost per kg of producing crops location i with vertical farming in location i.

CT(i) is defined similarly to CV(i) only for a traditional farming (field grown) practice:

$$CT(i) = \left(\sum_{j=0}^{j=4} p(i)_j \cdot Q_j\right)$$

Equation 2. The cost per kg of producing crops location i with traditional farming.

Using the regional price (pr(i)) the profit margin for each type of practice based on production costs is defined as follows:

$$PV(i) = \frac{pr(i) - CV(i)}{pr(i)}$$

Equation 3. Profit margin for a vertical farming practice in location i.

$$PT(i) = \frac{pr(i) - CT(i)}{pr(i)}$$

Equation 4. Profit margin for a traditional farming practice in location i.

PV(i) and PT(i) provide Applicants with marginal profit potentials of farming in a location with vertical and traditional practice, respectively. As defined in Equation 5, the relative profit margin potential for vertical farming is defined as PA(i). This way, one can interpret the higher the PA(i) value in a location, the better is the potential of implementing vertical farming from a production cost and profit margin potential standpoint.

$$PA(i) = PV(i) - PT(i)$$

Equation 5. Relative profit margin appeal of implementing vertical farming in location i.

Example 1.10. Regional Risk Appeal Indicator

In this Example, a regional risk indicator is introduced to measure the risks associated with practicing traditional agriculture in a particular location. Table 2 describes the parameters used in this model.

TABLE 2

Parameter description, unit and abbreviation for variables used in the Risk Appeal indicator.

| Name of the Variable | Unit | Abbv | Description |
| --- | --- | --- | --- |
| Risk appeal indicator | USD/acre | RA | Description is given on Equation 6 |
| Regional Insurance rate per acre | USD/acre | IR | Regional insurance rate per acre for producing a crop (lettuce in this case) with the common field grown traditional agriculture in a particular location |
| Regional Subsidy Rate | % | SR | Regional subsidy rate (provided by the federal government in the US) for producing a crop (lettuce in this case) with the common field grown traditional agriculture in a particular location |

RA(i) is defined as follows:

$$RA(i) = (1 - SR(i)) \cdot IR(i)$$

Equation 6. Risk appeal indicator for location i.

RA(i) calculates the amount paid for traditional farming insurance in location i.

Example 1.11. The Decision Model

Two location appeal indicators were proposed in Equation 5 and Equation 6, which assess the suitability of implementing a vertical farming venture in any location based on the profit margin and risk aversion potential, respectively.

$$minmaxscalar(X(i)) = \frac{X(i) - X_{min}}{X_{max} - X_{min}}$$

Equation 7. Minmax scalar function

Using the minmax scaling tool, Applicants can define Profit Decision Indicator (PDI) and Risk Decision Indication (RDI) as follows:

$$PDI(i) = minmaxscalar(PA(i))$$

Equation 8. Decision indicator based on regional costs $$RDI(i) = minmaxscalar(RA(i))$$

Equation 9. Decision indicator based on regional risk

The final Location Appeal (LA(i)) function can be defined based on the previous indicators:

$$LA(i) = (w1 \cdot PDI(i)) + (w2 \cdot RDI(i))$$

Equation 10. The final location appeal indicator

The LA(i) function would provide a score ranging between 0 and 1 that would indicate the relative appeal of a location for implementing vertical farming based on the relative economics, regional risks and investor's preferences. The higher the value of LA(i), the more appealing location i is for pursuing a vertical farming business venture and vice versa.

The following decision model can be utilized if one were looking to find the best location for implementing a vertical farming business based on the proposed indicators from a set of n locations. Find the optimum i in a condition that:

$$MAX\ Z = LA(i)$$

Where:

$$i = \{location\ 1, location\ 2, \ldots location\ n\}$$

Equation 11

Example 1.12. Design and Implement a Model-Based Decision Support System (DSS)

Figure 2:
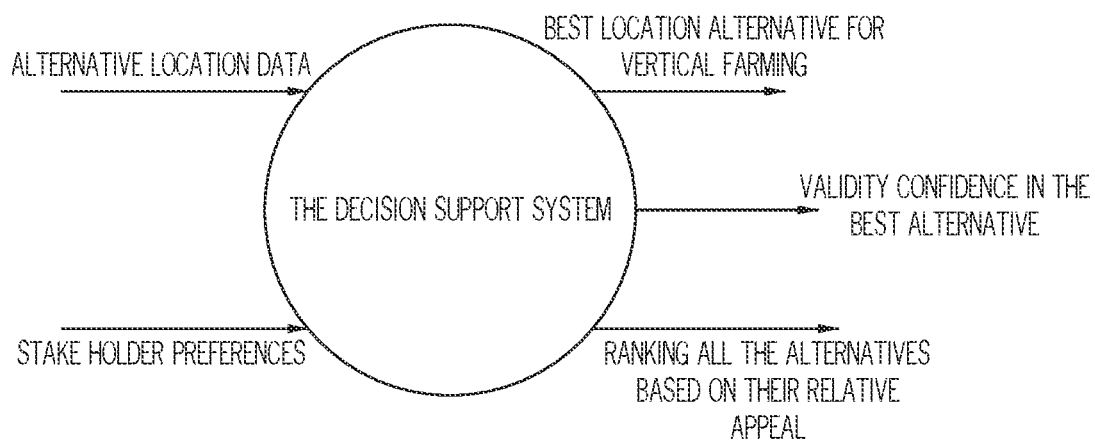
FIG. 2 illustrates a decision support system with general inputs and outputs for determining the feasibility of growing one or more crops.

Based on the above model, a decision support system (DSS) has been implemented. The DSS is illustrated in FIG. 2.

Example 1.13. Development of Data Flow Diagrams

Figure 3:
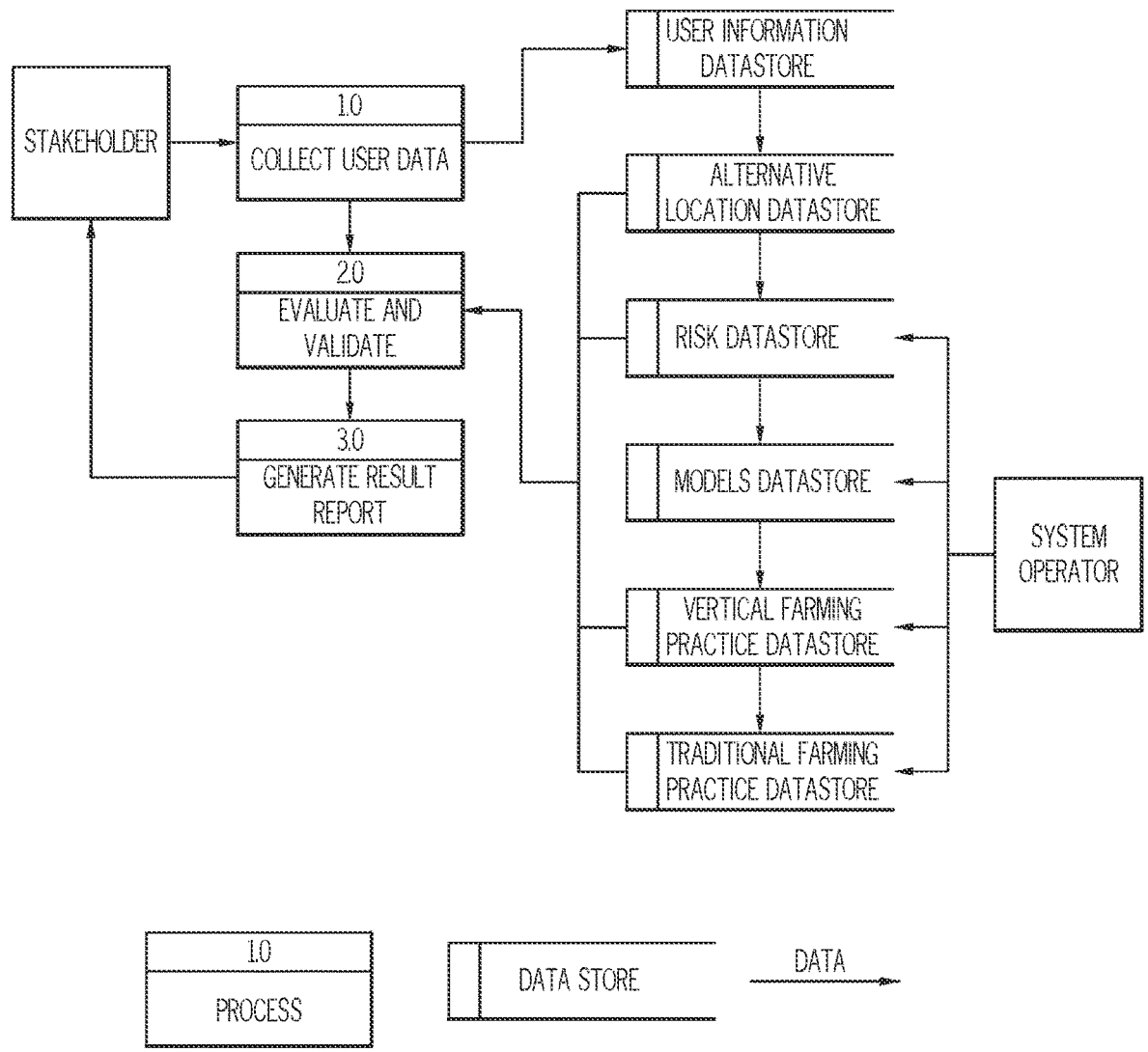
FIG. 3 illustrates a system data flow diagram (DFD) for determining the feasibility of growing one or more crops.

Data Flow Diagrams (DFD) are a very common tool in clearly illustrating the flow of data within a system (Gane & Sarson, 1977). The DFD for the proposed Decision Support System is illustrated in FIG. 3.

Figure 4:
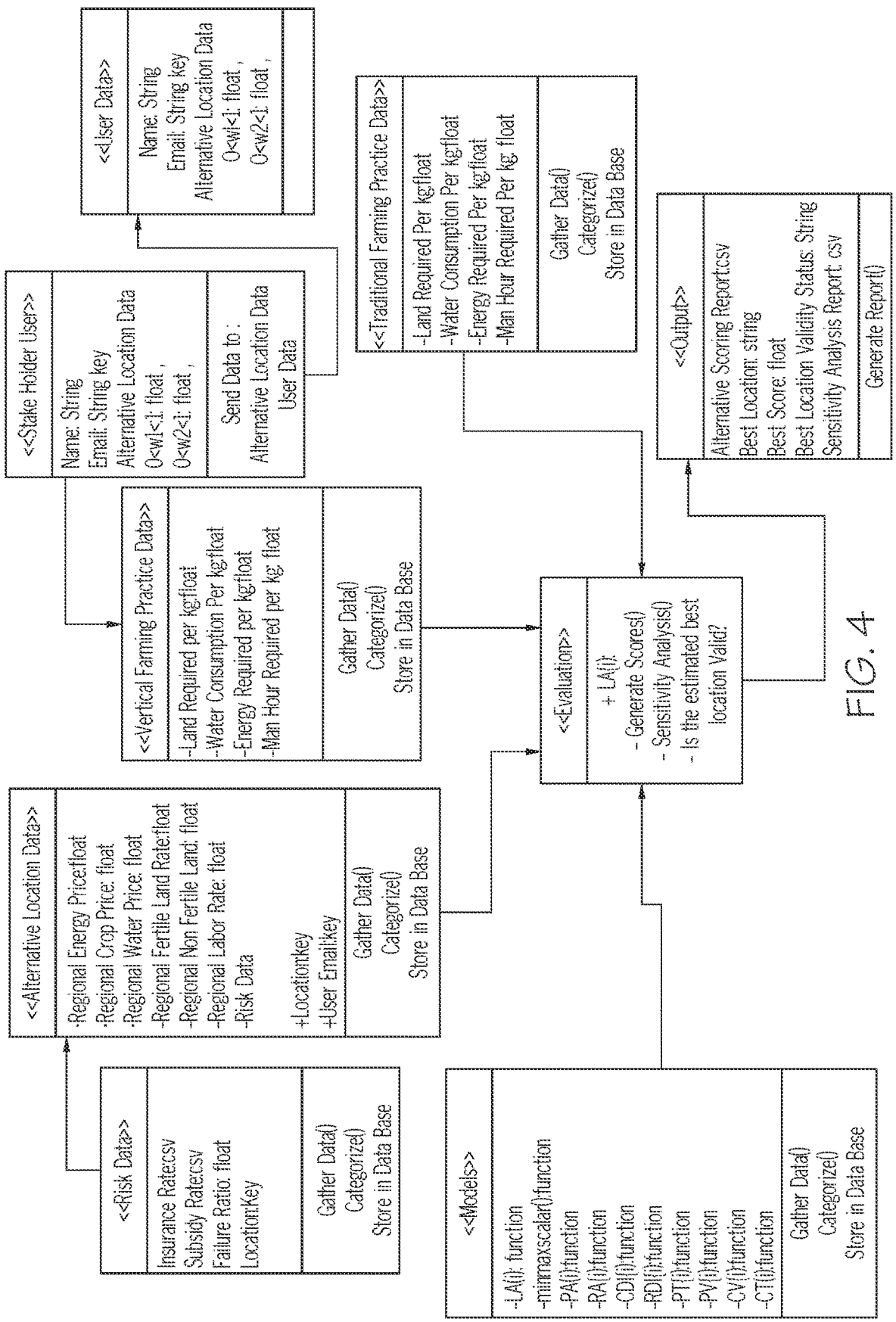
FIG. 4 illustrates a class diagram of a proposed decision support system for determining the feasibility of growing one or more crops.

One can see that the system operator would first plug in the required data as described in the data store segment into its respective data stores. Moreover, the stakeholder (user) would provide the necessary data to the system (see FIG. 4 for the exact data entered by the user). Then, the evaluation process would use the data entered by the user and called from the data stores to evaluate the alternatives and generate a report to the user.

Example 1.14. Class Diagrams

Class Diagrams are a very useful and common form to describe the structure of a system by illustrating systems classes, operations, and relationships among its objects (Sparks, 2011). The class diagram for the proposed Decision Support System is presented in FIG. 4. The class diagram basically shows all objects of the proposed systems and their relationship with one another. In Applicants' system's case, these objects include the six data stores, the Stakeholder user and the evaluation process.

Example 1.15. Comprehensive Flow Charts

Figure 5:
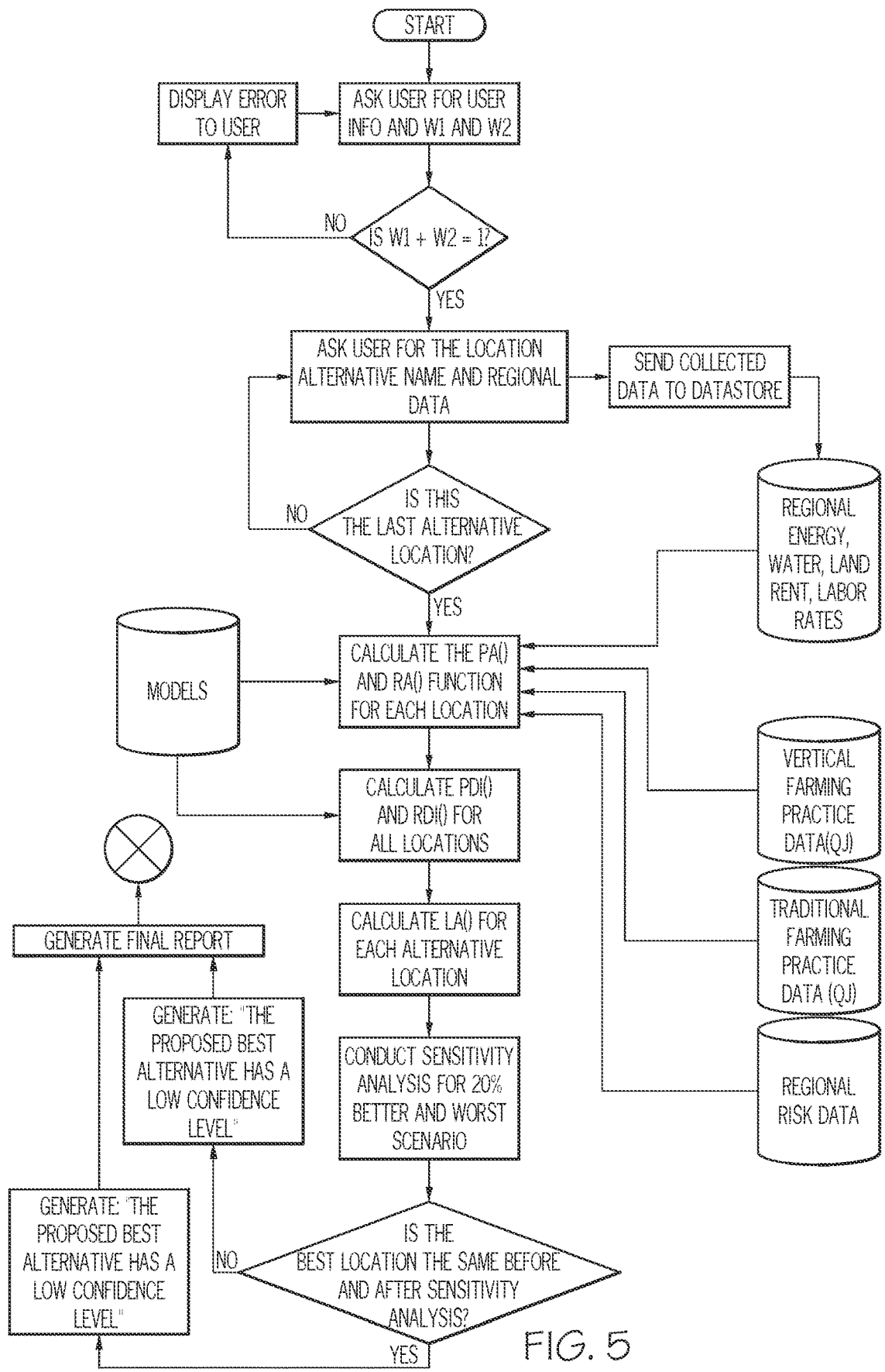
FIG. 5 illustrates a comprehensive flowchart for determining the feasibility of growing one or more crops.

In this Example, a comprehensive flowchart is provided to better illustrate the operations of the system along with its interactions with the user that were discussed in the previous segments. The comprehensive flow chart is shown in FIG. 5.

Example 1.16. Generated Results

The proposed system in this Example has been utilized to conduct small scale case studies with regards to the application of vertical farming in the US to show a glimpse of the potential insights that can be acquired by utilizing the system. Examples of the generated results are shown in FIGS. 6-9.

Figure 6:
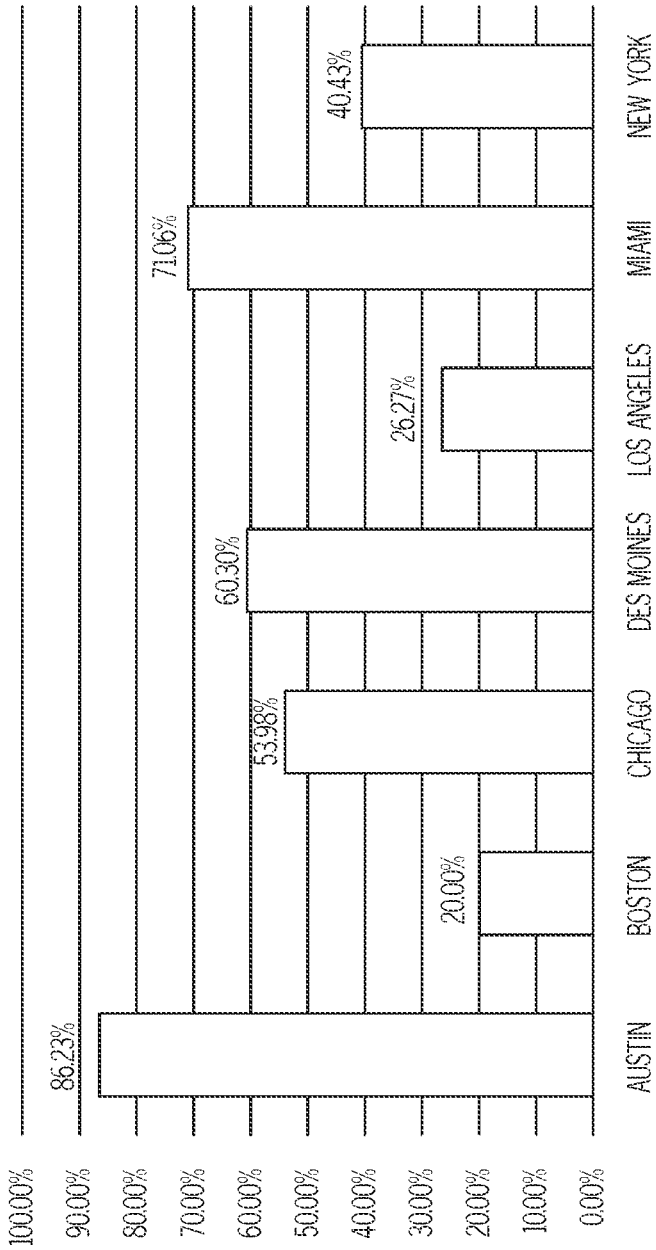
FIG. 6 illustrates a generated report of a relative location appeal of practicing vertical farming in a competitive market place.

For instance, FIG. 6 provides a chart that illustrates the relative appeal of various locations for practicing vertical farming. This result takes into account the profit potential as well as a risk aversion potential. In this experiment, the stakeholder is conducting evaluations with the current benchmark technology of the market. Also, the stakeholder's personality puts more emphasis on the importance of profit margin potential compared to risk aversion potential. FIG. 6 illustrates how the proposed system can be utilized by particular investors and business analysts towards strengthening their decision making process as well as increasing their insights into different market locations. It should also be noted that the proposed system can provide a comprehensive report with detailed numbers in this form of evaluation which are redacted here due to confidentiality.

Figure 7:
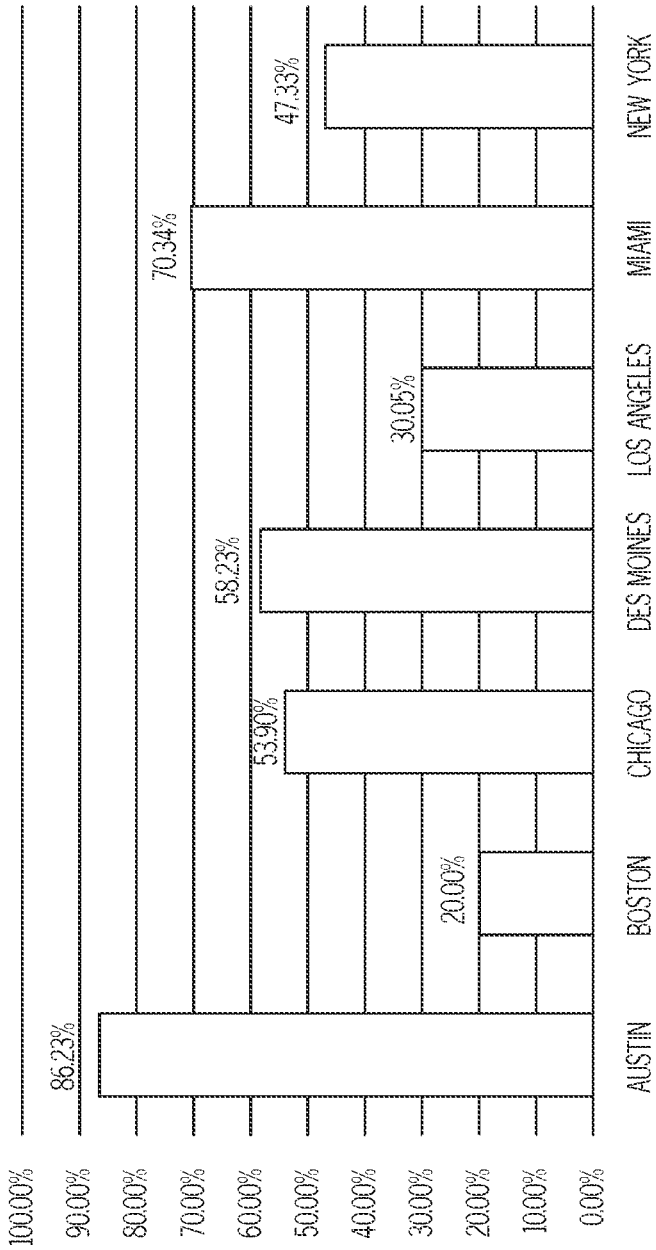
FIG. 7 illustrates another generated report of a relative location appeal of practicing vertical farming in a competitive market place.

FIG. 7 provides a chart similar to the previous result in FIG. 6 with the difference that in this case the stakeholder has a superior vertical farming technology compared to the industry. FIG. 7 illustrates how the proposed system can be utilized in an evaluation in which a stakeholder is looking to analyze a technology benchmark superior to the current state of the market (e.g., a tech with better automation, energy, water and land efficiency). This form of analyses can be utilized by stakeholders to assess the potential of novel technologies in different markets.

Figure 8:
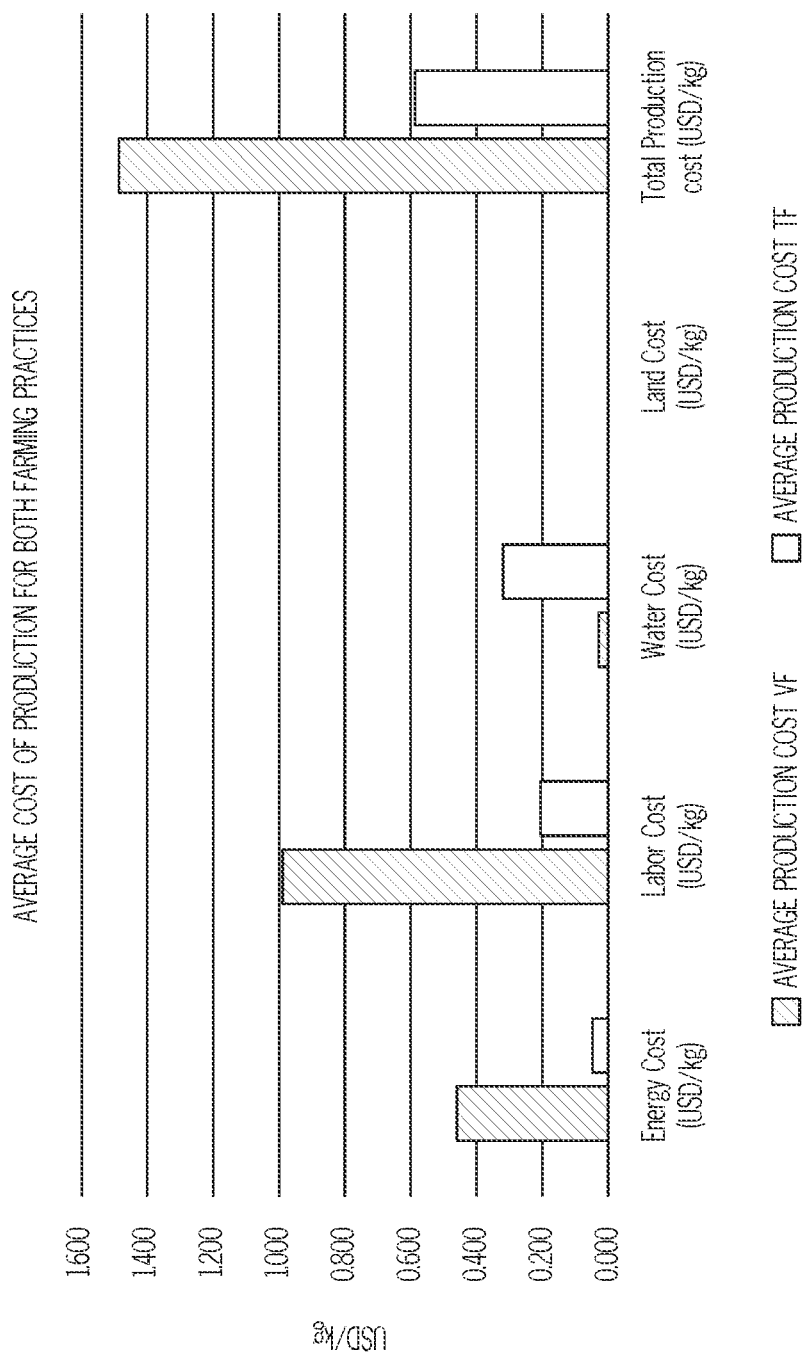
FIG. 8 illustrates the average costs of production of farming practices.

Similarly, FIG. 8 provides a chart that illustrates the average production cost break down of benchmark vertical farming technology in select location alternatives. FIG. 8 illustrates a scenario in which the invention is used to gain insights about the relative cost structure of vertical farming with respect to traditional agriculture under different conditions. This particular example analyzes the case for an industry benchmark technology of both practices in an average format in the US for producing lettuce. This assessment can utilize to gain various insights about the industry such where the most financial incentive is for technology improvement, possible favorable and unfavorable future trends for the industry, understanding important policy agendas, and the like.

Figure 9:
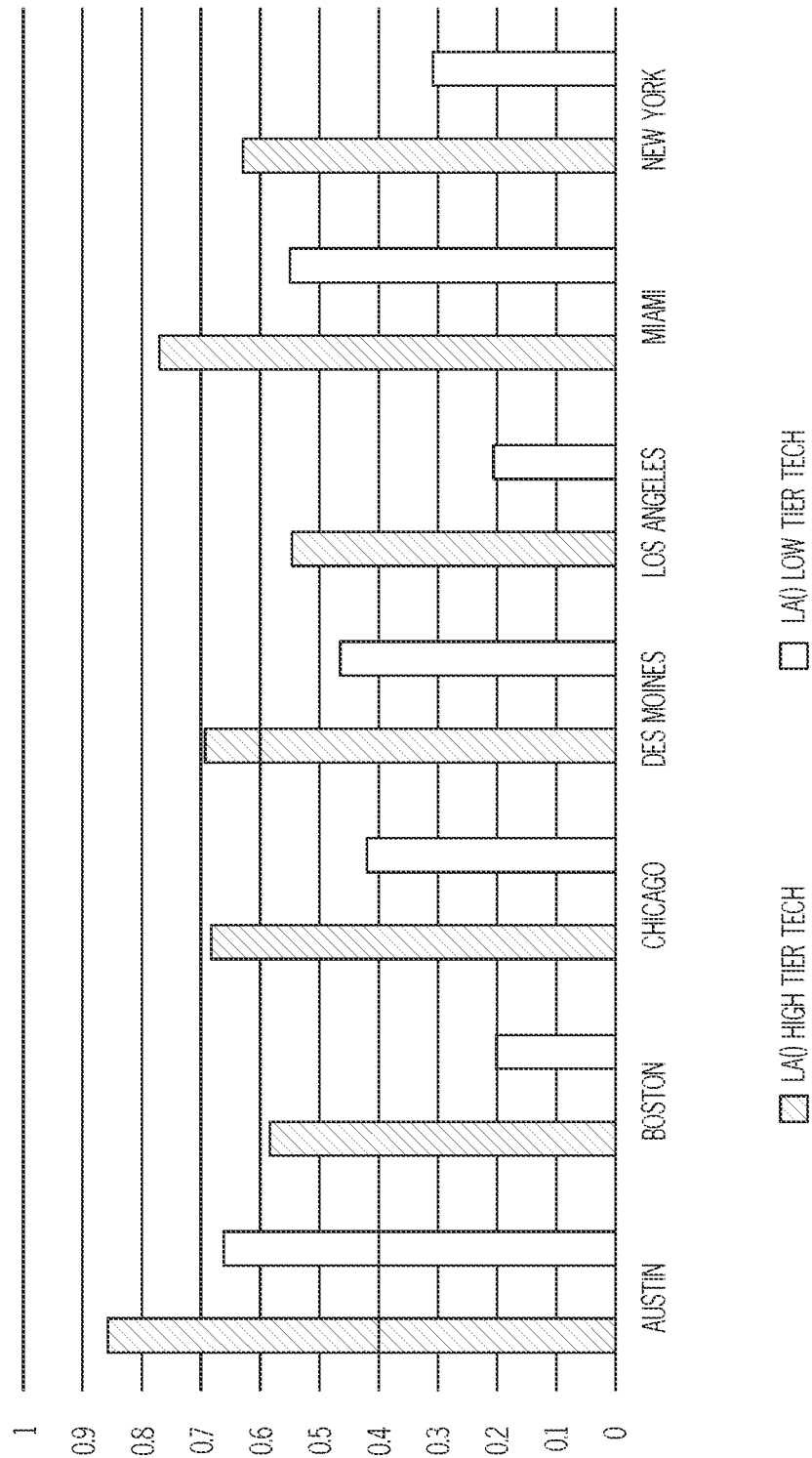
FIG. 9 illustrates the economic appeal of implementing two vertical technologies in various locations.

Likewise, FIG. 9 showcases a scenario in which in the proposed system is utilized to evaluate the economic appeal of implementing novel technologies in the market. FIG. 9 illustrates a case in which the proposed system is utilized to compare and evaluate a hypothetical novel superior vertical farming. In this case, the proposed system can be utilized to evaluate various vertical farming technologies and their economic potential in different markets.

Without further elaboration, it is believed that one skilled in the art can, using the description herein, utilize the present disclosure to its fullest extent. The embodiments described herein are to be construed as illustrative and not as constraining the remainder of the disclosure in any way whatsoever. While the embodiments have been shown and described, many variations and modifications thereof can be made by one skilled in the art without departing from the spirit and teachings of the invention. Accordingly, the scope of protection is not limited by the description set out above, but is only limited by the claims, including all equivalents of the subject matter of the claims. The disclosures of all patents, patent applications and publications cited herein are hereby incorporated herein by reference, to the extent that they provide procedural or other details consistent with and supplementary to those set forth herein.

What is claimed is:

1. A method of determining the economic feasibility of growing one or more crops, said method comprising:
    entering data related to a plurality of risk factors associated with the growing into a software, wherein the plurality of risk factors comprise location, scale of production, type of crop, the feed of the crop, the watering routine of the crop, expected profit, cost of production, cost appeal, potential for environmental harm from growing the crop, regional insurance rate, regional subsidy rate, and combinations thereof;
    entering data related to stake holder preferences for growing into the software, wherein the stake holder preferences data comprise land required, water consumption, energy required, man hour required, and combinations thereof;
    entering data related to alternative locations into the software, wherein the data related to alternative locations comprise regional energy price, regional crop price, regional water price, regional land price, regional labor rate, and combinations thereof;
    wherein the software utilizes a decision support system to compare the entered data with existing data and generate a report related to the economic feasibility of the growing based on the comparison, wherein the generated report comprises:
        a ranking of location alternatives for growing the one or more crops in one or more different regions,
        the relative location appeal of growing the one or more crops in one or more different regions,
        the production costs of growing the one or more crops in one or more different regions, and
        the economic appeal of growing the one or more crops in one or more different regions through the utilization of one or more different growing practices;
    growing the one or more crops in at least one selected location through at least one selected growing practice based on the determination of the economic feasibility of the growing.

2. The method of claim 1, wherein the existing data comprises at least one of vertical farming practice data, traditional farming practice data, regional risk data, or combinations thereof.

3. The method of claim 1, wherein the ranking of location alternatives for growing the one or more crops in one or more different regions comprises a ranking of relative cost structure of vertical farming in one or more different regions.

4. The method of claim 1, wherein the relative location appeal of growing the one or more crops in one or more different regions comprises the relative location appeal of growing the one or more crops based on vertical farming.

5. The method of claim 1, wherein the production costs of growing the one or more crops in one or more different regions comprises the production costs of growing the one or more crops based on vertical farming.

6. The method of claim 1, wherein the economic appeal of growing the one or more crops in one or more different regions through the utilization of one or more different growing practices is based on regional risk factors and investor preferences.

7. The method of claim 1, further comprising:
    tailoring the risk factors based on the determination of the economic feasibility of the growing, wherein tailoring the risk factors comprises tailoring at least one of a location of the crop, the feed of the crop, the type of the crop, the watering routine of the crop, or combinations thereof; and
    re-determining the economic feasibility of the growing by evaluation of the tailored risk factors.

8. The method of claim 1, wherein the growing occurs through a method selected from the group consisting of vertical farming, greenhouse farming, hydroponic farming, traditional farming, or combinations thereof.

9. The method of claim 1, wherein the growing occurs through vertical farming.

10. The method of claim 1, wherein the method is utilized to determine the economic feasibility of growing one or more crops through vertical farming.

11. The method of claim 1, wherein the one or more crops are selected from the group consisting of corn, cotton, wool, beans, fruits, nuts, potatoes, rice, soybeans, oil-based crops, sugars, vegetables, herbs, melons, wheat, and combinations thereof.

12. The method of claim 1, wherein the one or more risk factors comprise the scale of production of growing the one or more crops, wherein the scale of production is characterized by average seasonal production measured in weight.

13. The method of claim 1, wherein the one or more risk factors comprise the expected profit from growing the one or more crops, wherein the expected profit is evaluated by considering expected income, costs, taxes, or combinations thereof.

14. The method of claim 1, wherein the one or more risk factors comprise regional insurance rates and regional subsidy rates in a particular location.

15. The method of claim 1, wherein the one or more risk factors comprise the cost of production, wherein the cost of production is evaluated by considering labor cost, energy cost, rent cost, water cost, or combinations thereof.

16. The method of claim 1, wherein the one or more risk factors comprise cost appeal, wherein the cost appeal is evaluated by considering labor hours required per kg of crop, energy consumption per kg of crop, water consumption per kg of crop, land required per kg of crop, water price, energy price, land rent price, labor price, crop price, cost indicator function, profit margin for growing the crop, or combinations thereof.

17. The method of claim 1, wherein the one or more risk factors comprise the potential for environmental harm from growing the crop, wherein the potential for environmental harm from growing the crop is evaluated by considering expected greenhouse gas emissions from growing the crop, deforestation from growing the crop, waste production from growing the crop, irrigation harm from growing the crop, or combinations thereof.

* * * * *